US009563192B2

(12) United States Patent
Sauvain

(10) Patent No.: US 9,563,192 B2
(45) Date of Patent: Feb. 7, 2017

(54) SOFTWARE WORKSTATION AND METHOD FOR EMPLOYING APPENDED METADATA IN INDUSTRIAL AUTOMATION SOFTWARE

(71) Applicant: Rockwell Automation Technologies, Inc., Mayfield Heights, OH (US)

(72) Inventor: Terrie E. Sauvain, Sagamore Hills, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 470 days.

(21) Appl. No.: 14/146,164

(22) Filed: Jan. 2, 2014

(65) Prior Publication Data
US 2015/0185719 A1    Jul. 2, 2015

(51) Int. Cl.
    G05B 15/02    (2006.01)
    G06F 9/44     (2006.01)
    G05B 19/042   (2006.01)
    G06F 3/0481   (2013.01)

(52) U.S. Cl.
    CPC ......... *G05B 15/02* (2013.01); *G06F 8/73* (2013.01); *G05B 19/0426* (2013.01); *G06F 3/04812* (2013.01)

(58) Field of Classification Search
    CPC ......... G06F 3/04812; G06F 8/73; G05B 15/02
    USPC ............................................. 717/121; 700/83
    See application file for complete search history.

(56) References Cited

U.S. PATENT DOCUMENTS

| 7,107,520 | B2 * | 9/2006 | Gargi .................. G06F 17/3028 |
| | | | 707/E17.031 |
| 7,526,794 | B2 | 4/2009 | Chand et al. |
| 7,672,737 | B2 | 3/2010 | Hood et al. |
| 7,702,679 | B2 | 4/2010 | Barber et al. |
| 7,734,590 | B2 | 6/2010 | Chand et al. |
| 7,818,714 | B2 * | 10/2010 | Ryan ......................... G06F 8/10 |
| | | | 717/104 |
| 8,019,706 | B2 | 9/2011 | Madison, Jr. et al. |
| 8,086,649 | B1 | 12/2011 | Chand et al. |
| 8,346,006 | B1 | 1/2013 | Darbari et al. |
| 8,370,358 | B2 | 2/2013 | Lin et al. |
| 8,887,134 | B2 * | 11/2014 | Weatherhead .......... G06F 17/50 |
| | | | 717/107 |

(Continued)

FOREIGN PATENT DOCUMENTS

| EP | 1217533 A2 | 6/2002 |
| EP | 1770463 A1 | 4/2007 |

(Continued)

*Primary Examiner* — John Chavis

(57) ABSTRACT

A software workstation and method configured to employ appended metadata in an industrial automation software of an industrial automation environment are provided. The software workstation in one example includes an interface configured to interact with a user and communicate with an industrial automation system including the industrial automation software and a processing system coupled to the interface, with the processing system configured to obtain a metadata information, generate at least one metadata instance from the metadata information, associate the at least one metadata instance with one or more predetermined objects in the industrial automation software, and store the at least one metadata instance and the association as part of the industrial automation software.

20 Claims, 10 Drawing Sheets

(56) References Cited

U.S. PATENT DOCUMENTS

| | | | |
|---|---|---|---|
| 8,898,634 B2* | 11/2014 | Weatherhead | G06F 8/71 717/108 |
| 2007/0078537 A1* | 4/2007 | Chand | G06F 8/10 700/83 |
| 2009/0063976 A1 | 3/2009 | Bull et al. | |
| 2009/0204648 A1* | 8/2009 | Best | G06F 11/1451 |
| 2009/0217200 A1 | 8/2009 | Hammack et al. | |
| 2012/0198547 A1 | 8/2012 | Fredette et al. | |
| 2013/0132823 A1 | 5/2013 | Sutic | |
| 2013/0346455 A1* | 12/2013 | Prasad | G06F 17/30893 707/825 |

FOREIGN PATENT DOCUMENTS

| | | | |
|---|---|---|---|
| EP | 2557524 A1 | 2/2013 | |
| WO | 2007103804 A2 | 9/2007 | |
| WO | 2008103436 | 12/2009 | |
| WO | 2010053543 A1 | 5/2010 | |

* cited by examiner

SOFTWARE WORKSTATION AND METHOD FOR EMPLOYING APPENDED METADATA IN INDUSTRIAL AUTOMATION SOFTWARE

TECHNICAL BACKGROUND

Industrial automation is used to control many different machines and processes in manufacturing. Automated machines commonly control the handling of components, sub-components, and raw materials, perform fabrication processes, perform testing, and perform product handling, packaging, and shipping. Industrial automation enables precise control of industrial processes, achievement of smaller tolerances and better quality products, higher production outputs, and increased worker safety and productivity.

Industrial automation installations comprise multiple computerized devices that control industrial machines and industrial processes. The components of an industrial automation installation must work together in a coordinated fashion, performing operations such as exchanging data, controlling the timing and scheduling of processes, providing information to operators or technicians, and receiving operator inputs.

Increasingly, more and more of the typical industrial environment is automated. As a result, design and implementation of automation systems has become correspondingly more complex. This is especially true of industrial automation software. Creating industrial automation software increasingly requires teams of designers who may need to divide the software generation into tasks, with specific groups of designers creating each sub-unit of software.

Industrial automation software may include software sub-units for a plurality of automation devices. Industrial automation software may include software sub-units for automation devices of different manufacturers and/or of different protocols or standards. Industrial automation software may include software sub-units for automation devices that perform various tasks. Industrial automation software may include software sub-units for controlling the timing and interactions of various automation devices and processes.

Multiple software designers may work on a particular industrial automation software. The software designers may work on different portions of the industrial automation software. This can lead to access conflicts where multiple software designers try to work on the same portion of the industrial automation software. This can lead to software designers being unaware of each other's actions and as a result can make conflicting changes to the software. Further, where the software is very large and complex, individual software designers may have difficulty in finding or returning to a specific portion of the industrial automation software.

Overview

A software workstation and method configured to employ appended metadata in an industrial automation software of an industrial automation environment are provided. The software workstation in one example includes an interface configured to interact with a user and communicate with an industrial automation system including the industrial automation software, and a processing system coupled to the interface, with the processing system configured to obtain a metadata information, generate at least one metadata instance from the metadata information, associate the metadata instance with one or more predetermined objects in the industrial automation software, and store the at least one metadata instance and the association as part of the industrial automation software.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
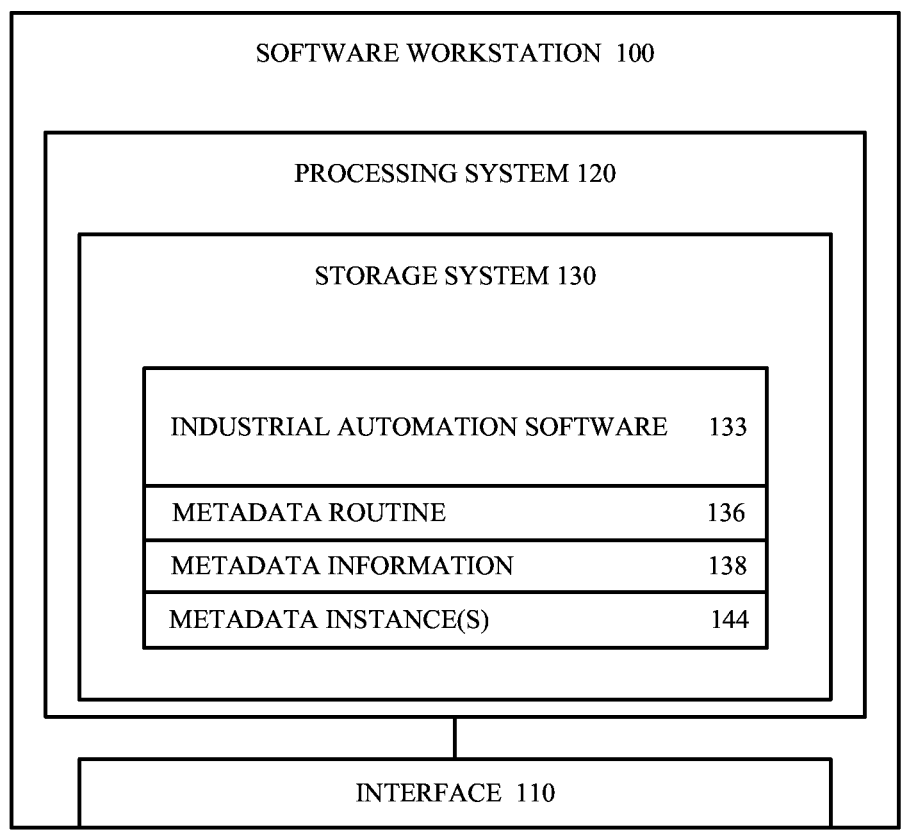
FIG. 1 shows an exemplary software workstation configured to employ appended metadata in an industrial automation software of an industrial automation environment.

FIG. 1 shows an exemplary software workstation 100 configured to employ appended metadata in an industrial automation software 133 of an industrial automation environment 50. The software workstation 100 comprises a computer workstation for the design and construction of at least a portion of an industrial automation software 133. The software workstation 100 can be used by the software designer to create and test the industrial automation software 133, including before the industrial automation software 133 is used in the industrial automation environment 50 (see FIG. 3). Alternatively, or in addition, the software workstation 100 can be used by the software designer to monitor the operation and performance of the industrial automation software 133 when used in the industrial automation environment 50.

The software workstation 100 enhances a software design process by enabling a software designer or designers to append metadata to the industrial automation software 133. The appended metadata becomes part of the industrial automation software 133. The software designer therefore can create and append custom metadata to the industrial automation software 133. The appended metadata can facilitate the software design process. The appended metadata can be viewed and utilized by all software designers of a design team. The appended metadata aids in manipulating and viewing the industrial automation software 133, including changing views, searching, and filtering of portions of the industrial automation software 133.

The software workstation 100 can append metadata to the industrial automation software 133 during an initial design process, such as before the industrial automation software 133 is operationally executed and employed by the industrial automation system 200. Further, the software workstation 100 can append metadata to the industrial automation software 133 during operation or after operation of a device or system executing the industrial automation software 133.

The software workstation 100 includes an interface 110 and a processing system 120 coupled to the interface 110. The interface 110 in some examples comprises a communication device and an input and output device. The interface 110 is configured to interact with a user and communicate with an industrial automation system 200 including the industrial automation software 133. The software designer, industrial automation technician, or operator (i.e., the user) can access and view the industrial automation software 133 via the interface 110, among other things.

The processing system 120 includes and operates using software routines, operational values, and other data. The processing system 120 in the example shown includes the industrial automation software 133, a metadata routine 136, a metadata information 138, and one or more metadata instances 144.

The metadata routine 136 processes the metadata information 138. The metadata routine 136 generates the one or more metadata instances 144. The metadata routine 136 appends the one or more metadata instances 144 to the industrial automation software 133. It should be understood that other or additional operations can be performed by the metadata routine 136.

The metadata information 138 comprises information to be included in the one or more metadata instances 144. The metadata user input can comprise information including instructions or routines for constructing a metadata instance and the metadata information 138 to be included in the metadata instance.

The metadata information 138 can comprise any suitable form of information to be appended to the industrial automation software 133. The metadata information 138 can comprise symbols, characters, text, numbers, graphical information representations, audio information, or video or animation-form information.

The metadata information 138 is entered into the software workstation 100 by a user or operator in some examples, such as by a software designer. The metadata information 138 is directly received in the software workstation in some examples. Alternatively, the metadata information 138 can be communicated to the software workstation from an external device or external source.

The one or more metadata instances 144 comprise metadata instances to be appended to the industrial automation software 133. The one or more metadata instances 144 are formed from at least a portion of the metadata information 138. The metadata instance 144 can comprise metadata information that is encapsulated in computer code or in a computer protocol frame in some examples. The one or more metadata instances 144 can include a routine or routines that generate a display or presentation graphic using the stored metadata information 138.

The one or more metadata instances 144 can comprise any manner of symbols, characters, text, or numbers. The one or more metadata instances 144 can comprise graphical information representations, including an image or images, and can include image playback controls. The one or more metadata instances 144 can comprise audio information and can include audio playback controls. The one or more metadata instances 144 can comprise video or animation-form information and can include video playback controls. The one or more metadata instances 144 can comprise combinations of various types of information. The one or more metadata instances 144 can comprise new and unique metadata information, or can comprise a modification or update of an existing metadata instance in the industrial automation software 133.

The metadata instance 144 is associated with a predetermined object or objects in the industrial automation software 133 by the software workstation 100. The association comprises a linkage between the metadata instance 144 and the predetermined object or objects. Therefore, when the predetermined object is being displayed, the metadata instance 144 will also be displayed. Multiple associations are generated if the metadata instance 144 is associated with more than one predetermined object.

An object can comprise an ephemeral set of attributes (object elements) and behaviors (methods or subroutines) encapsulating an entity. An object can comprise a variable, function, or data structure. An object can comprise a particular instance of a class. An object according to object-oriented programming can comprise a data structure together with an associated processing routine.

A metadata instance and association(s) can augment the industrial automation software 133. A metadata instance and association(s) can extend or add attributes to an associated object. For example, in a software development environment, the metadata instance and association(s) can display additional information about the object to anyone who accesses the industrial automation software 133. The metadata instance and association(s) can include information explaining the purpose of the object, explaining how the object is intended to operate when being executed, labeling the object as to development status or version or developer identity who has last touched the object, or other development-related information.

In one example, the metadata routine 136 when executed by the software workstation 100 in general or the processing system 120 in particular operates to direct the software workstation 100 or the processing system 120 to obtain a metadata information 138, generate at least one metadata instance 144 from the metadata information 138, associate the metadata instance 144 with one or more predetermined objects in the industrial automation software 133, and store the at least one metadata instance 144 and the association as part of the industrial automation software 133.

The metadata instance 144 and the association(s) can be inserted into the industrial automation software 133 in one example. In another example, the metadata instance 144 and the association(s) can be stored separately in the industrial automation system, but linked to the industrial automation software 133. In some examples, the software workstation can additionally or alternatively store the metadata instance 144 and the association(s).

The interface 110 comprises a network card, network interface, port, or interface circuitry that allows the software workstation 100 to communicate, including over wired or wireless networks. The interface 110 may also include a memory device, software, processing circuitry, or some other device. The interface 110 can use any suitable communication protocol to exchange communications. The interface 110 includes equipment and circuitry for receiving user input and control. Examples of the equipment and circuitry for receiving user input and control include graphical user interfaces, push buttons, touch screens, selection knobs, dials, switches, actuators, keys, keyboards, pointer devices, microphones, transducers, potentiometers, non-contact sensing circuitry, accelerometers, or other human-interface equipment. The interface 110 also includes equipment to communicate information to a user of the software workstation 100. Examples of the equipment to communicate information to the user could include displays, graphical user interfaces, indicator lights, lamps, light-emitting diodes, haptic feedback devices, audible signal transducers, speakers, buzzers, alarms, vibration devices, or other indicator equipment, including combinations thereof.

The processing system 120 in some examples can comprise one or more microprocessors and other circuitry that retrieves and executes the metadata routine 136. The processing system 120 can be implemented within a single processing device but can also be distributed across multiple processing devices or sub-systems that cooperate in executing program instructions. Examples of the processing system 120 include general purpose central processing units, application specific processors, and logic devices, as well as any other type of processing device, combinations, or variations thereof.

In some examples, the processing system 120 includes a computer readable storage media capable of storing the metadata routine 136. The processing system 120 can include volatile and nonvolatile, removable and non-removable media implemented in any method or technology for storage of information, such as computer readable instructions, data structures, program modules, or other data.

Data may be stored in and recalled from a storage system 130 in the software workstation 100. The storage system 130 can comprise any computer readable storage media readable by the processing system 120 and capable of storing the metadata routine 136. The storage system 130 can include volatile and nonvolatile, removable and non-removable media implemented in any method or technology for storage of information, such as computer readable instructions, data structures, program modules, or other data. The storage system 130 may be independent from or integrated into the processing system 120.

In addition to storage media, in some implementations the storage system 130 can also include communication media over which the metadata routine 136 can be communicated. The storage system 130 can be implemented as a single storage device but can also be implemented across multiple storage devices or sub-systems co-located or distributed relative to each other. The storage system 130 can comprise additional elements, such as a controller, capable of communicating with the processing system 120. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In addition to storage media, in some examples the processing system 120 can also include communication media over which the metadata routine 136 can be communicated. The processing system 120 can be implemented to include a single storage device but can also be implemented to include multiple storage devices or sub-systems co-located or distributed relative to each other. The processing system 120 can comprise additional elements, such as a controller, capable of communicating with the storage media. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In general, the metadata routine 136 can, when loaded into the processing system 120 and executed, transform the processing system 120 into a special-purpose computing system configured to employ appended metadata in an industrial automation software, among other operations. Encoding the metadata routine 136 on the processing system 120 can transform the physical structure of the processing system 120. The specific transformation of the physical structure can depend on various factors in different implementations of this description. Examples of such factors can include, but are not limited to the technology used to implement the storage media of the processing system 120 and whether the computer-storage media are characterized as primary or secondary storage. For example, if the computer-storage media are implemented as semiconductor-based memory, the metadata routine 136 can transform the physical state of the semiconductor memory when the program is encoded therein. For example, the metadata routine 136 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The metadata routine 136 in the examples comprises computer programs, firmware, or some other form of machine-readable processing instructions. The metadata routine 136 may include an operating system, utilities, drivers, network interfaces, applications, virtual machines, or some other type of software. The metadata routine 136 can include additional processes, programs, or components, such as operating system software, database software, or application software. The metadata routine 136 can also comprise firmware or some other form of machine-readable processing instructions executable by the processing system 120.

The metadata routine 136 in the examples can include additional processes, programs, or components, such as operating system software, database software, or application software. The metadata routine 136 can also comprise firmware or some other form of machine-readable processing instructions executable by the processing system.

Figure 2:
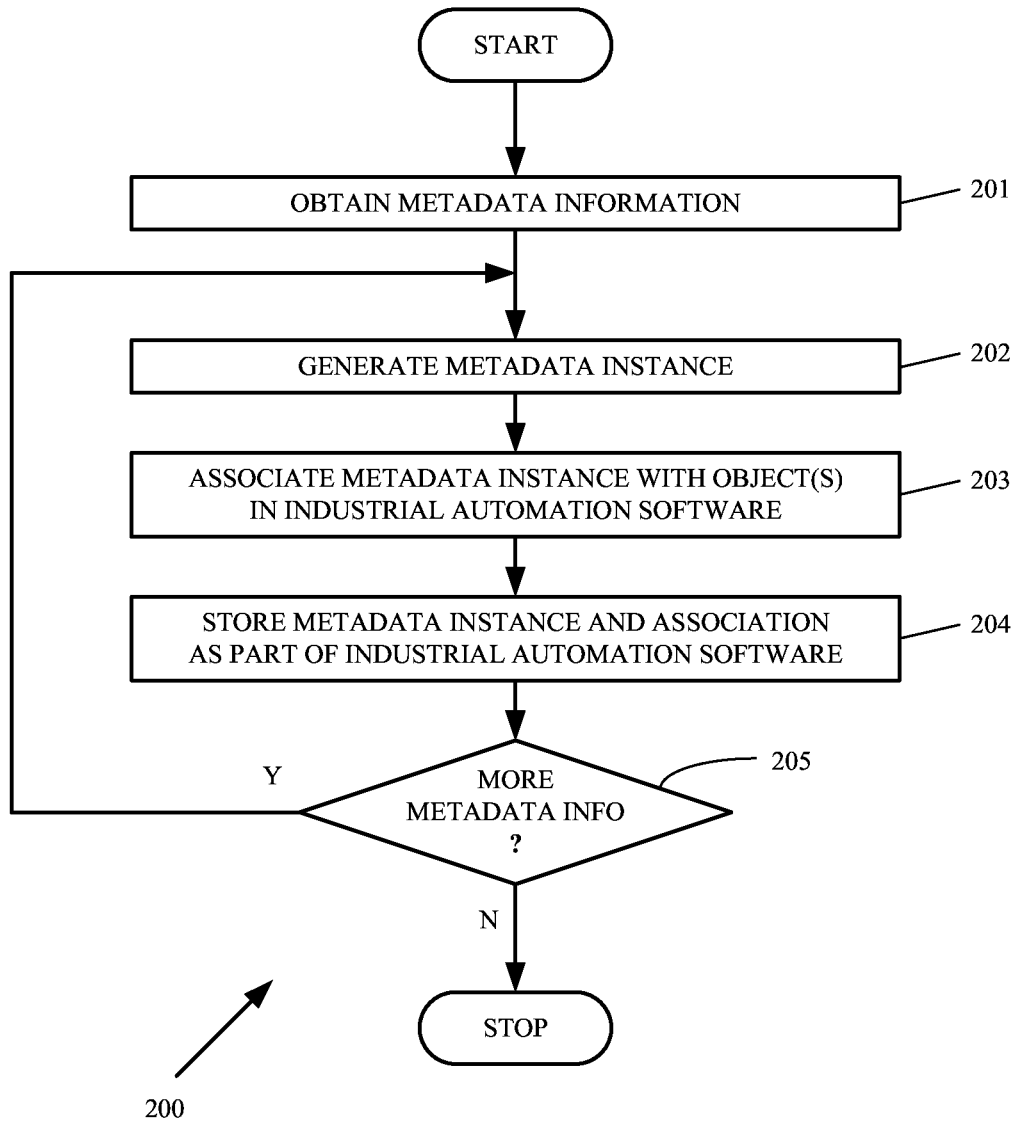
FIG. 2 shows a flowchart of an exemplary method for employing appended metadata in an industrial automation software of an industrial automation environment during a design phase.

FIG. 2 shows a flowchart 200 of an exemplary method for employing appended metadata in an industrial automation software of an industrial automation environment during a design phase. The method can be performed by a software workstation that operates on the industrial automation software. The software workstation can be a part of the industrial automation environment or can be in communication with the industrial automation environment. In step 201, metadata information is obtained by the software workstation, as previously discussed.

In step 202, the software workstation generates a metadata instance from the metadata information, as previously discussed.

In step 203, the software workstation associates the metadata instance with a predetermined object or objects in the industrial automation software, as previously discussed. The association comprises a linkage between the metadata instance and the predetermined object or objects. Multiple associations are generated if the metadata instance is associated with more than one predetermined object.

In step 204, the software workstation stores the metadata instance and the association (or associations) as part of the industrial automation software, as previously discussed.

In step 205, the method determines if more metadata information remains to be processed. If there is more metadata information, the method loops back to step 202 and iteratively processes the remaining metadata information and generates additional metadata instances. Otherwise, where there is no more metadata information, the method ends.

Figure 3:
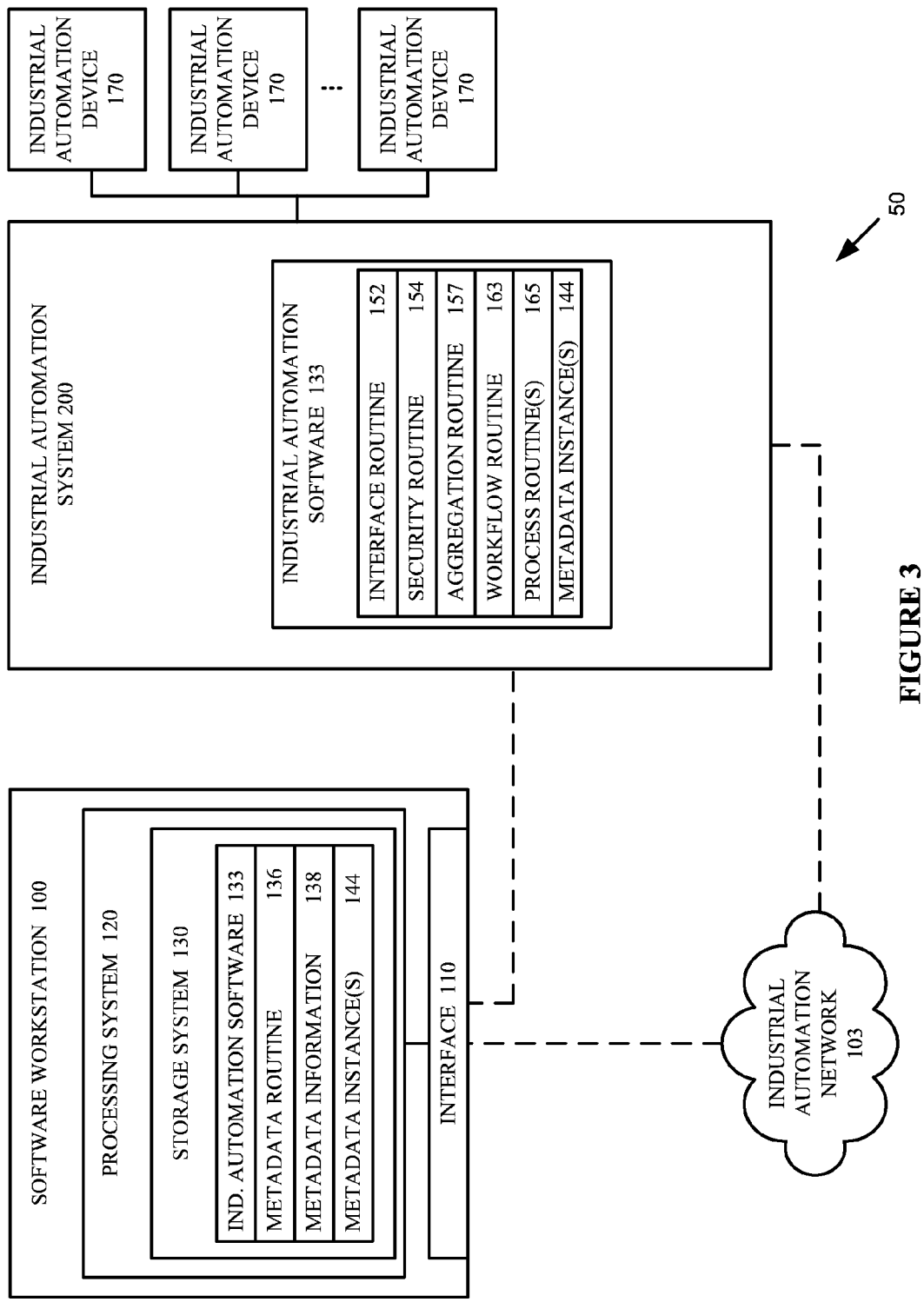
FIG. 3 shows an exemplary industrial automation environment.

FIG. 3 shows an exemplary industrial automation environment 50. The industrial automation environment 50 can comprise an industrial automation system or a software development environment, for example. The industrial automation environment 50 in this example comprises an industrial automation system 200, a plurality of industrial automation devices 170 coupled to the industrial automation system 200, and the software workstation 100 coupled to the industrial automation system 200.

The industrial automation devices 170 can comprise controllers or control devices that control one or more industrial automation components or control at least a portion of an industrial process. The industrial automation devices 170 can comprise monitors or monitoring devices that monitor one or more industrial automation components or monitor at least a portion of an industrial process. The industrial automation devices 170 can comprise measurement devices that measure one or more industrial automation components or measure at least a portion of an industrial process. The industrial automation devices 170 can comprise data-gathering or data-relaying devices that exchange communications with other devices of an industrial automation environment. The industrial automation devices 170 can comprise various combinations of the above devices. Other and additional industrial automation devices 170 are contemplated and are within the scope of the description and claims.

The industrial automation software 133 may include software routines for a plurality of industrial automation devices 170. The industrial automation software 133 may include software routines for industrial automation devices 170 of different manufacturers and/or of different protocols or standards. The industrial automation software 133 may include software routines for industrial automation devices 170 that perform various tasks. The industrial automation software 133 may include software routines for controlling the timing and time-wise interactions of various industrial automation devices 170 and processes.

The industrial automation system 200 can store and execute the industrial automation software 133. The industrial automation software 133 comprises software for performing an industrial automation process, wherein the industrial automation software 133 controls various industrial automation devices and/or processes. The industrial automation system 200 is configured for performing the industrial automation process. The industrial automation system 200 can be used in the industrial automation environment 50 to control or operate an industrial process. The industrial automation system 200 can monitor and control any number and any type of industrial automation devices.

In addition to software development, in some examples the software workstation 100 can also be used to monitor the industrial automation system 200 or the industrial automation environment 50, in some examples. The software workstation 100 can be coupled directly to the industrial automation system 200 or can communicate with the industrial automation system 200 through an industrial automation network 103. The industrial automation environment 50 may include additional components and facilities that are omitted for clarity.

A software designer can use the software workstation 100 to generate, review, or modify some or all of the industrial automation software 133, as previously discussed. A software designer or industrial automation technician can employ the software workstation 100 to access the industrial automation software 133. The software designer can further elect and manipulate specific portions of the industrial automation software 133 and can make changes to the industrial automation software 133 using the software workstation 100.

The software workstation 100 can use the appended metadata to view and/or manipulate the industrial automation software 133. The software workstation 100 can use the appended metadata to locate and view specific portions of the industrial automation software 133. The software workstation 100 can use the appended metadata to zoom in or out at specific regions of a display of the industrial automation software 133. The software workstation 100 can use the appended metadata to change views of a software data structure representing the industrial automation software 133. The software workstation 100 can use the appended metadata to change views of a process data structure representing the industrial automation process. The views can comprise a tree view, a branch view, a node view, or a list or table view, for example, when the data structure is being displayed as a logic tree. The software workstation 100 can use the appended metadata to search for a specific metadata instance or instances in the industrial automation software 133. The software workstation 100 can use the appended metadata to filter on a specific metadata instance or instances in the industrial automation software 133.

The industrial automation software 133 may be generated and modified by multiple software designers. The designers may work on different portions of the industrial automation software 133. This can lead to access conflicts where different designers try to work on the same portion of the industrial automation software 133. This can lead to scheduling difficulties if different designers need to work on the same portion of the industrial automation software 133. This can lead to designers being unaware of each other's actions and this can result in conflicting changes to the industrial automation software 133. Further, where the software 133 is very large and complex, the individual software designers may have difficulty in finding or returning to a specific portion of the industrial automation software 133. As a result, it may become difficult for individual software designers to coordinate with other software designers to ensure that the industrial automation software 133 is complete, proper, and will operate efficiently and reliably.

The industrial automation software 133 can comprise a plurality of routines in some examples. In the example shown, the industrial automation software 133 includes an interface routine 152, a security routine 154, an aggregation routine 157, a workflow routine 163, and one or more process routines 165. Other or additional routines may be included, and the above listing is merely an example and is not exhaustive and does not limit the routines that can be included in the industrial automation software 133.

The interface routine 152 in the example comprises an interface provided for a user or users, such as an operator or technician. The interface routine 152 can include appropriate input and output capabilities that enable the operator or technician to monitor and control the industrial automation system 200 and the industrial automation process.

The security routine 154 in the example comprises a security interface. The security routine 154 can permit or block access to the industrial automation system 200.

The aggregation routine 157 in the example comprises a data interface. The aggregation routine 157 can receive and aggregate data from various automation devices or processes. The aggregation routine 157 can receive and aggregate any and all data generated by the industrial automation environment 50, as controlled by the industrial automation software 133.

The workflow routine 153 in the example comprises an integration routine that schedules and integrates various automation devices and processes, such as the one or more process routines 165. For example, the workflow routine 153 may execute the one or more process routines 165 according to a predetermined sequence or sequences, according to process measurements or milestones, according to user inputs, or various combinations of factors.

The one or more process routines 165 comprise routines that control automation devices and/or automation processes. Any number of process routines 165 can be included in the industrial automation software 133. The one or more process routines 165 can be scheduled to be executed by the industrial automation software 133 in some examples. The one or more process routines 165 can be executed based at least in part on process measurements or milestones. The one or more process routines 165 can be executed based at least in part on operator inputs.

In another example, the metadata routine 136 when executed by the software workstation 100 in general or the processing system 120 in particular operates to direct the software workstation 100 or the processing system 120 to display at least a portion of the industrial automation software 133 and display one or more metadata instances 144 included within the at least a portion of the industrial automation software 133, with the one or more metadata instances 144 being associated with the one or more objects in the industrial automation software 133, receive a user selection of at least one object of the one or more objects in the industrial automation software 133, and modify the display of the industrial automation software 133 based on at least one metadata instance 144 associated with the at least one object.

A metadata instance 144 can provide custom markers or groups for searching and/or displaying. A metadata instance 144 can provide a marker or group information that can be used to search and find specific objects. For example, a metadata instance 144 can specify all industrial automation devices 170 that have been upgraded to a newer machine and/or newer software routine.

A metadata instance 144 can be used to switch views in a generated display of the industrial automation software 133. A metadata instance 144 can be used to switch the display between a tree view, a branch view, and/or a node view in some examples.

Figure 5:
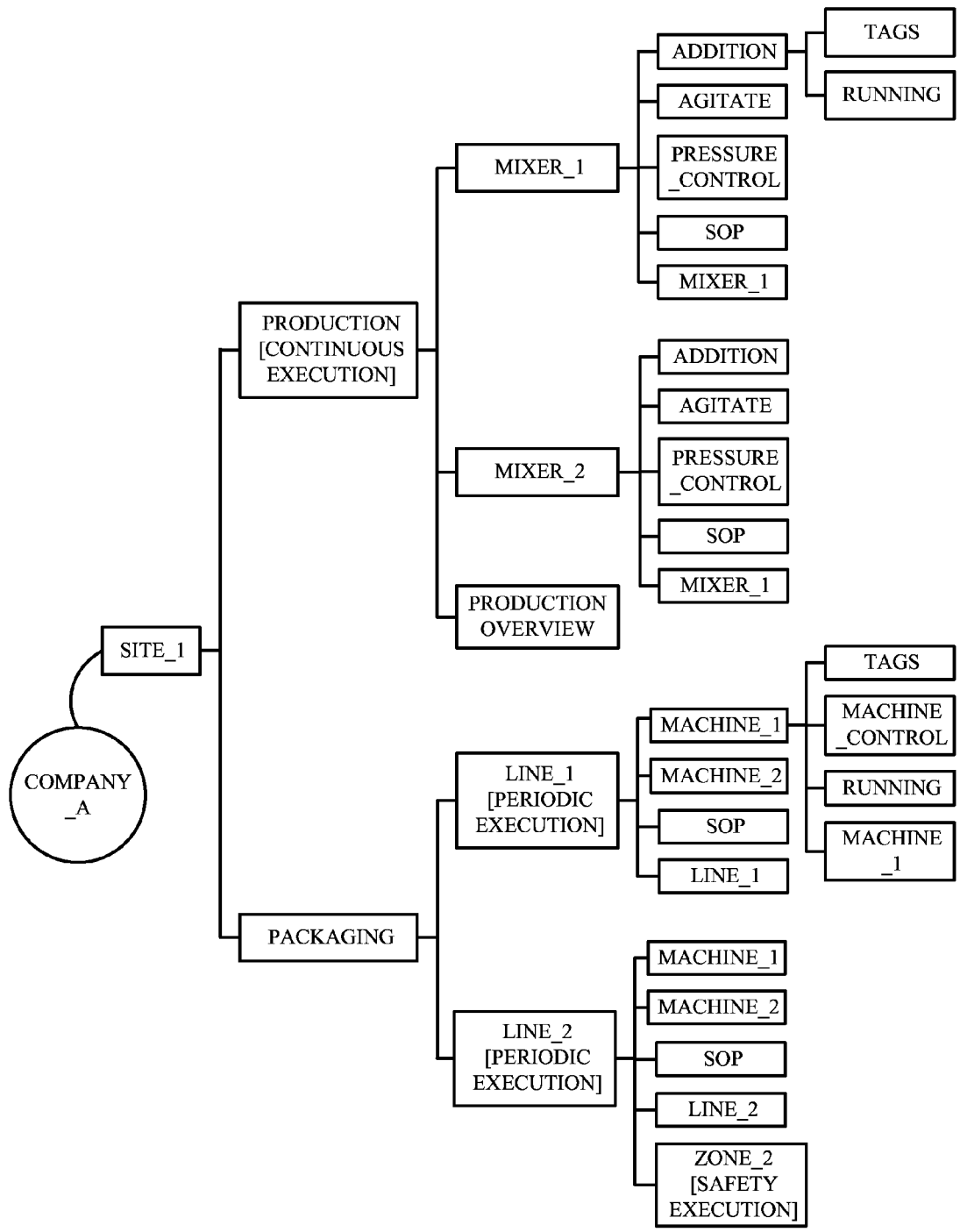
FIG. 5 shows a display example of at least a portion of the industrial automation software.

A tree view in some examples can display all graphical portions of the industrial automation software 133, as is shown in FIG. 5. A tree view can display all portions of the industrial automation environment, including multiple industrial automation devices and processes.

A branch view will display a subset of the tree view, such as a sub-grouping of industrial automation devices 170 or processes, as shown in FIGS. 6-8 and 10. A branch view will not display all industrial automation devices 170 and all industrial automation processes, but will be able to display more information for the industrial automation devices 170 and processes that are shown in the branch view.

A node view will display only a specific industrial automation device 170 or specific industrial automation step or process. A node view can display more node information than the tree view or the branch view.

Figure 4:
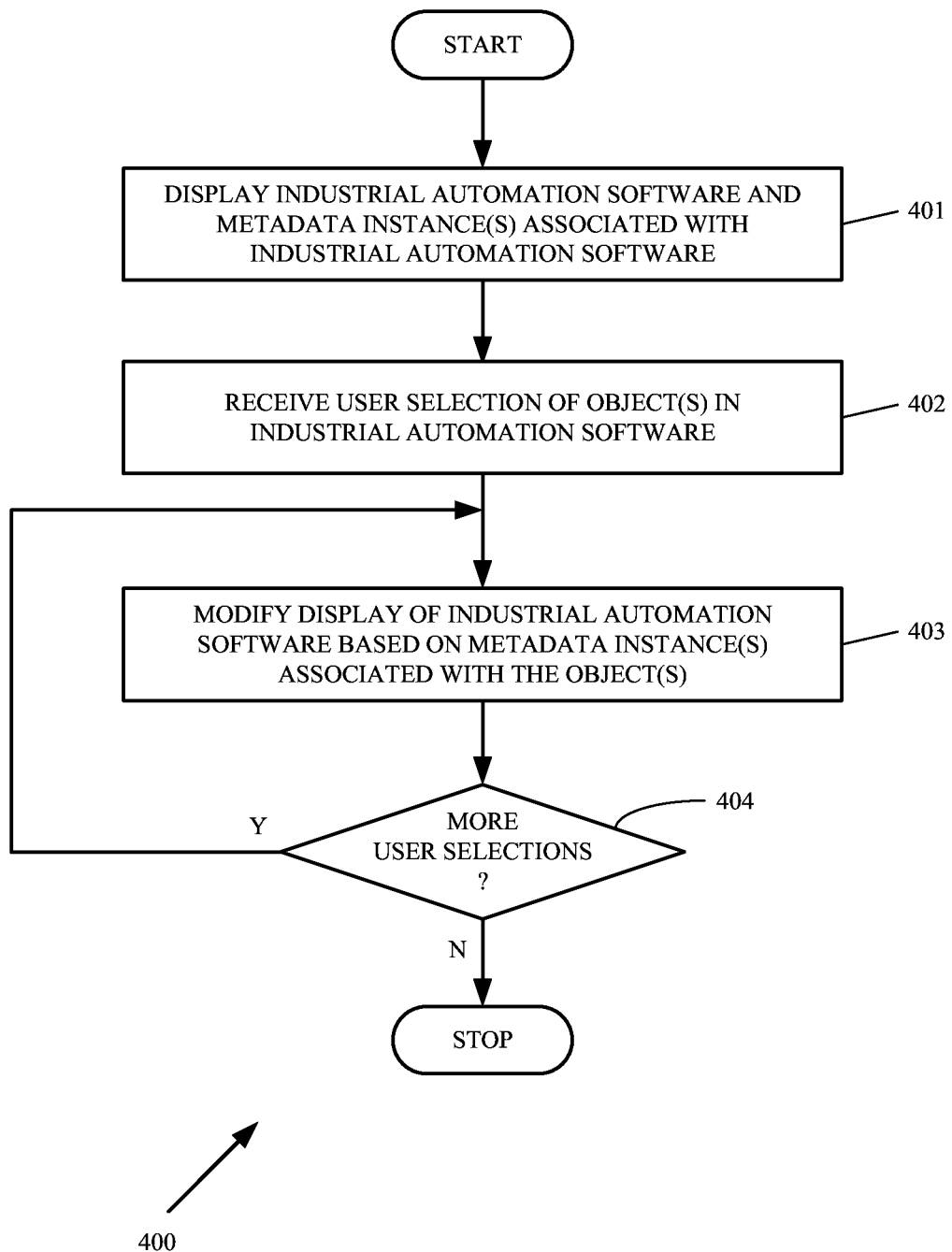
FIG. 4 shows a flowchart of an exemplary method for employing appended metadata in an industrial automation software of an industrial automation environment during an operational phase.

FIG. 4 shows a flowchart 400 of an exemplary method for employing appended metadata in an industrial automation software of an industrial automation environment during an operational phase. In step 401, a software workstation displays at least a portion of the industrial automation software and one or more metadata instances included within the portion of the industrial automation software. Some or all of the industrial automation software may be displayed at the direction of the user of the software workstation. The industrial automation software and the one or more metadata instances may be displayed on a display device of the software workstation. The industrial automation software and the one or more metadata instances may be displayed on one or more software workstations. The one or more metadata instances comprise metadata instances associated with the portion of the industrial automation software that is being displayed. The metadata instances are associated with one or more objects in the industrial automation software.

In step 402, the software workstation receives a user selection of at least one object in the industrial automation software. The user selection comprises a display selection for the display of the industrial automation software. The user selection comprises a selection of at least a portion of the industrial automation software to be displayed, and includes the at least one object.

In step 403, the software workstation modifies the graphical display of the industrial automation software based on one or more metadata instances associated with the selected at least one object.

In step 404, the software workstation determines whether there are any more user selections to be processed. If there are more user selections to be processed, then the method loops back up to step 403, wherein the user selections are iteratively processed. Otherwise, where there are no more user selections to be processed, the method ends.

FIG. 5 shows a display example of at least a portion of the industrial automation software 133. The figure shows a plant view for an industrial automation environment of COMPANY_A. The figure shows an entire tree structure. The figure includes a marker group named "EXECUTION." The figure includes tags for "PRODUCTION," "LINE_1," and "LINE_2."

Figure 6:
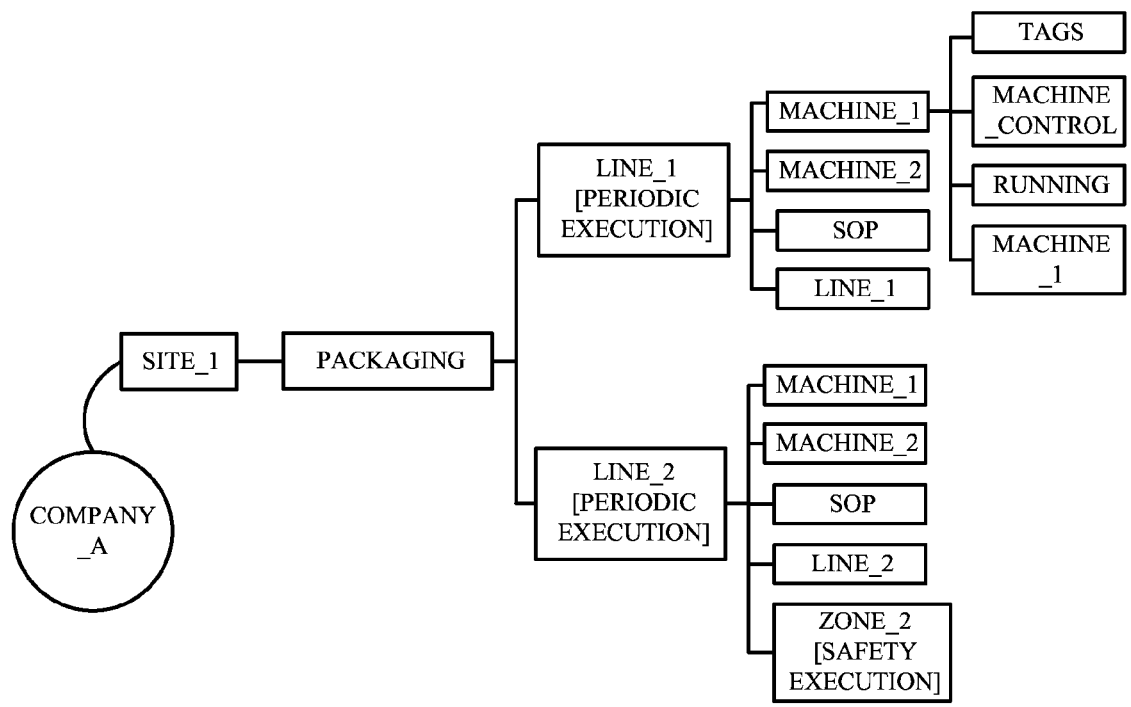
FIG. 6 shows a display example where the industrial automation software is filtered to show only the nodes that have appended metadata for periodic execution.

FIG. 6 shows a display example where the industrial automation software 133 is filtered to show only the nodes that have appended metadata for periodic execution. As a result, this view shows only the "PACKAGING" branch of the tree structure.

Figure 7:
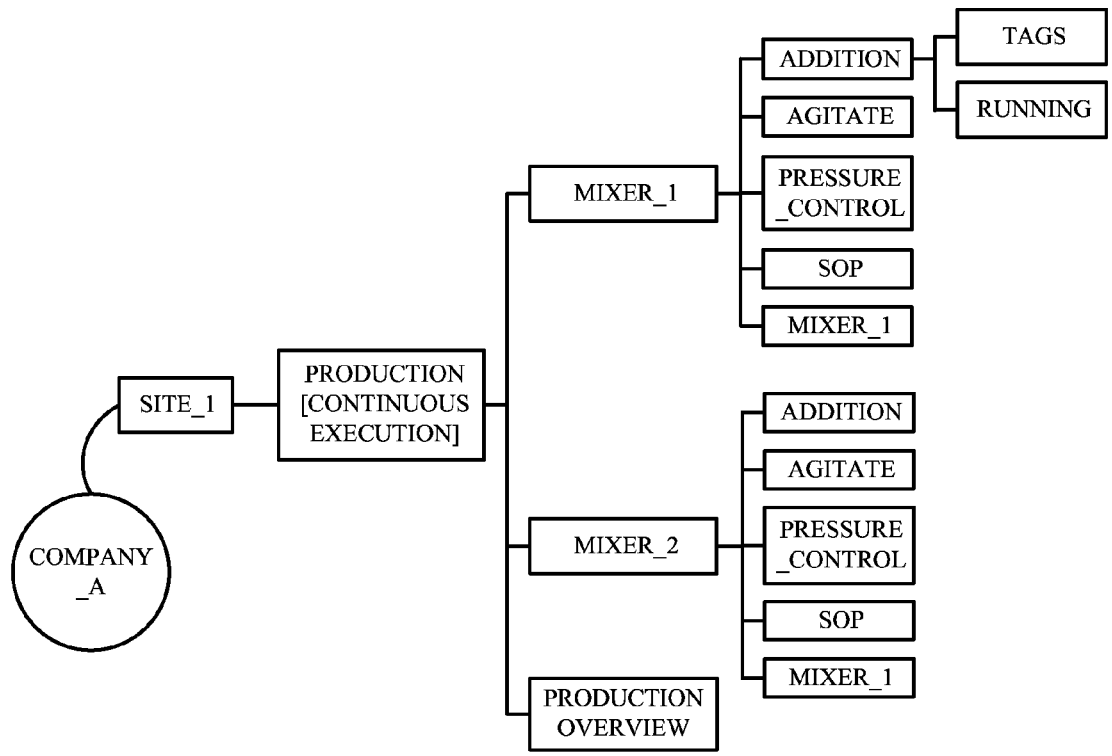
FIG. 7 shows a display example where the industrial automation software is filtered to show only the nodes that have appended metadata for continuous execution.

FIG. 7 shows a display example where the industrial automation software 133 is filtered to show only the nodes that have appended metadata for continuous execution. As a result, this view shows only the "PRODUCTION" branch of the tree structure.

Figure 8:
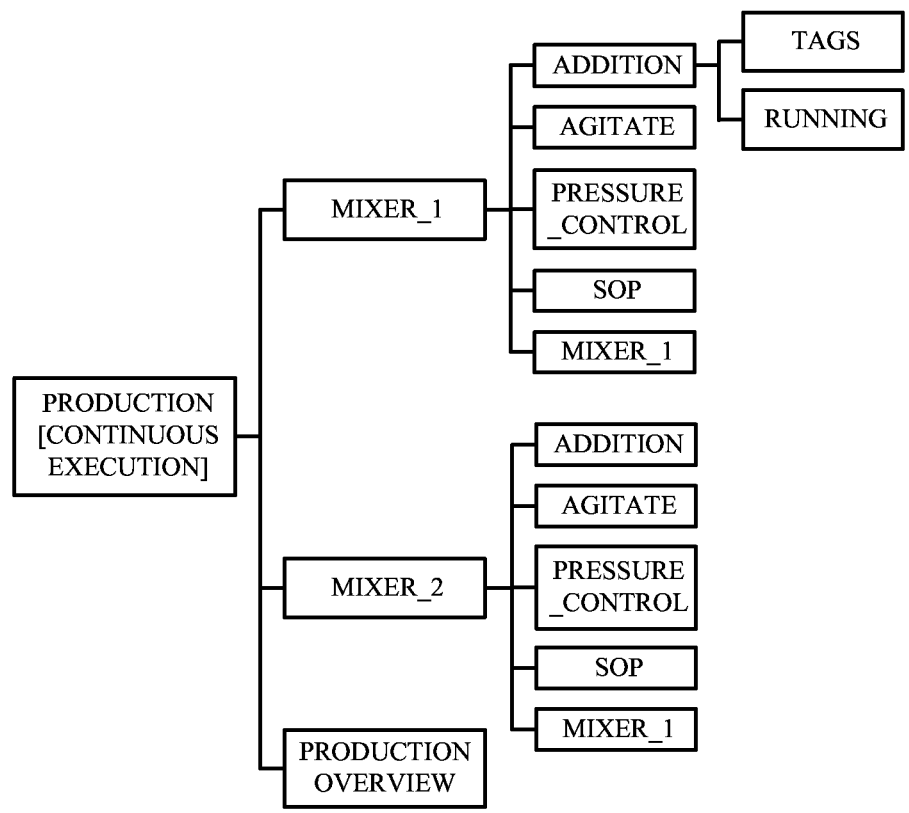
FIG. 8 shows a display example where the display has been filtered to show only appended metadata for continuous execution.

FIG. 8 shows a display example where the display has been filtered to show only appended metadata for continuous execution. Only a branch of the tree structure is selected for viewing. The figure is only showing continuous execution in the "PRODUCTION" area.

Figure 9:
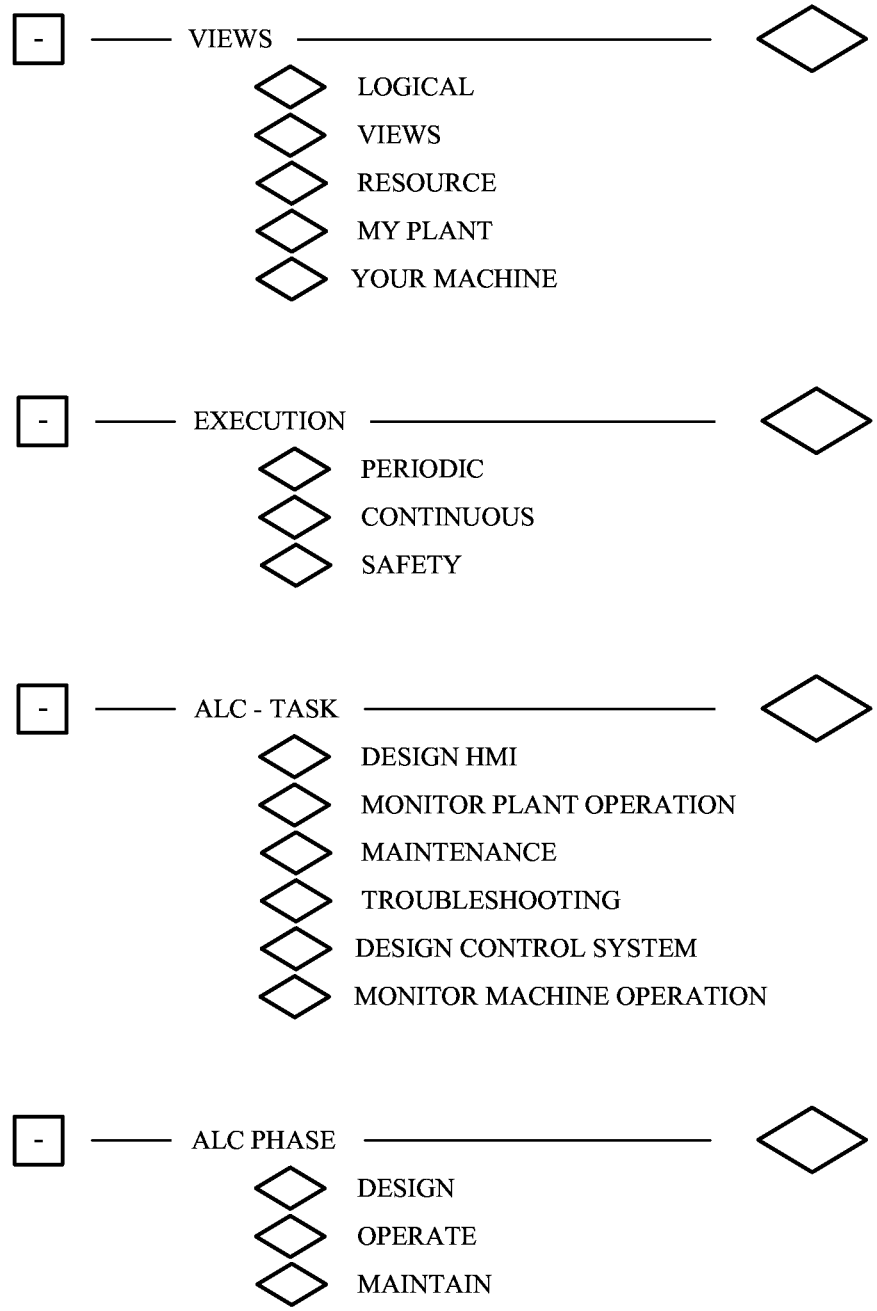
FIG. 9 shows a text-only display example using appended metadata.

FIG. 9 shows a text-only display example using appended metadata. The appended metadata can be used to select or de-select the items or nodes to be displayed.

Figure 10:
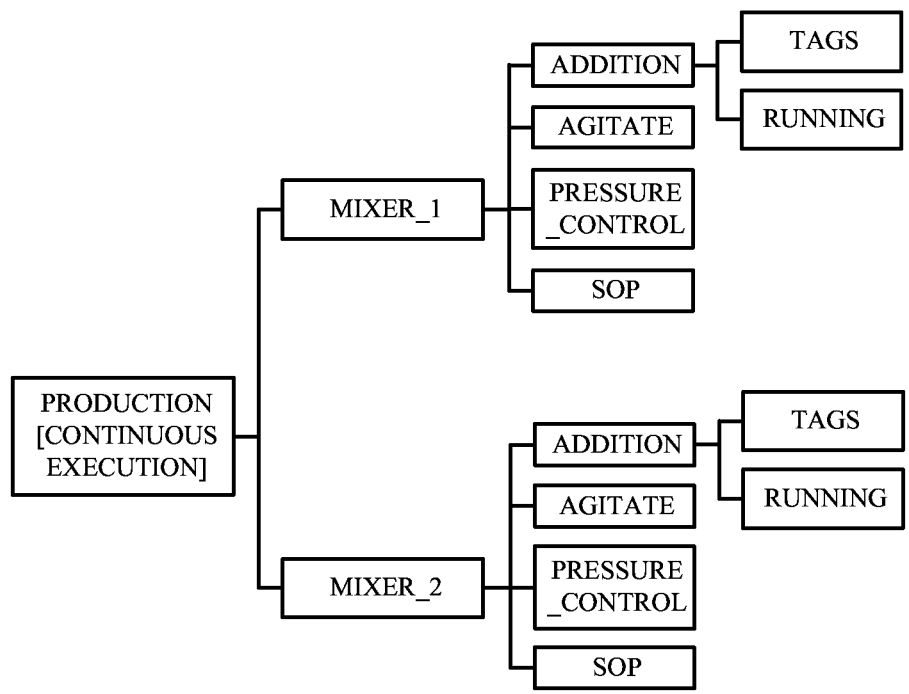
FIG. 10 shows a display example of a troubleshooting view that shows control code.

FIG. 10 shows a display example of a troubleshooting view that shows control code. The appended metadata can be employed to show only the control code that is being continuously executed. In some examples, the figure can comprise a troubleshooting view for a specific engineer, such as where the engineer has appended metadata at a code location and can now quickly and easily find the specific code location.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A software workstation configured to employ appended metadata in an industrial automation software of an industrial automation environment, comprising:
an interface configured to interact with a user and communicate with an industrial automation system including the industrial automation software; and
a processing system coupled to the interface, with the processing system configured to obtain a metadata information, generate at least one metadata instance from the metadata information, associate the at least one metadata instance with one or more predetermined objects in the industrial automation software, and store the at least one metadata instance and the association as part of the industrial automation software.

2. The software workstation of claim 1, with the at least one metadata instance comprising a user-defined attribute.

3. The software workstation of claim 1, with the at least one metadata instance comprising a user-defined grouping.

4. The software workstation of claim 1, with the at least one metadata instance comprising a user-defined grouping, wherein the grouping can be used to control a display of the industrial automation software.

5. The software workstation of claim 1, with the at least one metadata instance comprising a user-defined grouping, wherein the grouping can be used to navigate a display of the industrial automation software.

6. The software workstation of claim 1, with the at least one metadata instance comprising a user-defined grouping, wherein the grouping can be used to manipulate the display of the industrial automation software.

7. The software workstation of claim 1, with the processing system further configured to display at least a portion of the industrial automation software and display one or more metadata instances included within the at least a portion of the industrial automation software, with the one or more metadata instances being associated with the one or more objects in the industrial automation software, receive a user selection of at least one object of the one or more objects in the industrial automation software, and modify the display of the industrial automation software based on at least one metadata instance associated with the at least one object.

8. A method for employing appended metadata in an industrial automation software of an industrial automation environment, comprising:
in a software workstation, obtaining a metadata information;
in the software workstation, generating at least one metadata instance from the metadata information;
in the software workstation, associating the at least one metadata instance with one or more predetermined objects in the industrial automation software; and
in the software workstation, storing the at least one metadata instance and the association as part of the industrial automation software.

9. The method of claim 8, with the at least one metadata instance comprising a user-defined attribute.

10. The method of claim 8, with the at least one metadata instance comprising a user-defined grouping.

11. The method of claim 8, with the at least one metadata instance comprising a user-defined grouping, wherein the grouping can be used to control a display of the industrial automation software.

12. The method of claim 8, with the at least one metadata instance comprising a user-defined grouping, wherein the grouping can be used to navigate a display of the industrial automation software.

13. The method of claim 8, with the at least one metadata instance comprising a user-defined grouping, wherein the grouping can be used to manipulate the display of the industrial automation software.

14. The method of claim 8, further comprising:
in the software workstation, displaying at least a portion of the industrial automation software and displaying one or more metadata instances included within the at least a portion of the industrial automation software, with the one or more metadata instances being associated with the one or more objects in the industrial automation software;
in the software workstation, receiving a user selection of at least one object of the one or more objects in the industrial automation software; and
in the software workstation, modifying the display of the industrial automation software based on at least one metadata instance associated with the at least one object.

15. A method for employing appended metadata in an industrial automation software of an industrial automation environment, comprising:
in a software workstation, displaying at least a portion of the industrial automation software and displaying one or more metadata instances included within the at least a portion of the industrial automation software, with the one or more metadata instances being associated with one or more objects in the industrial automation software;

in the software workstation, receiving a user selection of at least one object of the one or more objects in the industrial automation software; and in the software workstation, modifying the display of the industrial automation software based on at least one metadata instance associated with the at least one object.

16. The method of claim 15, with modifying the display of the industrial automation software based on the at least one metadata instance comprising the software workstation selecting one of a tree view, a branch view, or a node view.

17. The method of claim 15, with modifying the display of the industrial automation software based on the at least one metadata instance comprising the software workstation filtering out display objects based on the at least one metadata instance associated with the particular object.

18. The method of claim 15, with modifying the display of the industrial automation software based on the at least one metadata instance comprising the software workstation filtering out data types based on the at least one metadata instance associated with the particular object.

19. The method of claim 15, with modifying the display of the industrial automation software based on the at least one metadata instance comprising the software workstation filtering out display nodes based on the at least one metadata instance associated with the particular object.

20. The method of claim 15, with modifying the display of the industrial automation software based on the at least one metadata instance comprising the software workstation filtering out automation devices or automation actions based on the at least one metadata instance associated with the particular object.

* * * * *